(12) United States Patent  
Curtin et al.

(10) Patent No.: US 8,415,562 B2
(45) Date of Patent: Apr. 9, 2013

(54) AIR SEAL DEVICE

(75) Inventors: Daniel J. Curtin, Alexandria, VA (US); William W. Reynolds, Pasadena, MD (US); Daniel B. Kennedy, Lovettsville, VA (US)

(73) Assignee: Tate Access Floors Leasing, Inc., Wilmington, DE (US)

( * ) Notice: Subject to any disclaimer, the term of this patent is extended or adjusted under 35 U.S.C. 154(b) by 294 days.

(21) Appl. No.: 13/040,851

(22) Filed: Mar. 4, 2011

(65) Prior Publication Data

US 2012/0223489 A1 Sep. 6, 2012

(51) Int. Cl.
*H02G 3/18* (2006.01)

(52) U.S. Cl.
USPC .............. 174/50; 206/320; 141/100; 277/309

(58) Field of Classification Search .................. 174/650, 174/23 R, 10, 113 R; 206/806, 319, 591, 206/522, 320, 524.8, 287.1; 128/206.24, 128/207.14, 207.15; 141/2, 38, 100, 67, 141/65, 51, 68; 277/627, 416, 309, 306; 415/170.1, 174.2, 173.1; 361/700, 690, 691
See application file for complete search history.

(56) References Cited

U.S. PATENT DOCUMENTS

| 1,980,831 | A | 11/1934 | Rosenfield |
| 2,165,691 | A | 7/1939 | Bell |
| 3,965,629 | A | 6/1976 | Pearson |
| 4,465,288 | A | 8/1984 | Kofoed, Sr. |
| 5,114,766 | A | 5/1992 | Jacques |
| 6,064,003 | A | 5/2000 | Moore et al. |
| 6,278,061 | B1 | 8/2001 | Daoud |
| 6,632,999 | B2 | 10/2003 | Sempliner et al. |
| 6,702,255 | B2 | 3/2004 | Dehdashtian |
| 6,906,267 | B2 | 6/2005 | Levy et al. |
| 7,507,912 | B1 | 3/2009 | Sempliner et al. |
| 7,723,622 | B2 * | 5/2010 | Dukes et al. .................. 174/650 |
| 2002/0121456 | A1 * | 9/2002 | Mannion et al. .............. 206/806 |
| 2008/0142015 | A1 * | 6/2008 | Groll ........................ 128/206.24 |
| 2010/0132830 | A1 * | 6/2010 | Rittgers et al. ..................... 141/2 |

FOREIGN PATENT DOCUMENTS

GB 2 420 552 A 5/2006

OTHER PUBLICATIONS

"Raised Floor Grommet Components," Flex-Guard Design Sheet, Memtec, Inc., Jun. 2009.
"Raised Floor Brush Grommets Cable Management for Computer Rooms and Data Centers," retrieved from [http://www.flex-guard.com/brush-grommet/raised-floor-brush-gromm . . . ], Oct. 19, 2010.
"Brush Cable Management—Cable Organizers," retrieved from [http://www.flex-guard.com/brush-grommets/cable-management-brush-orgranizer.asp], Oct. 19, 2010.

* cited by examiner

*Primary Examiner* — Hung Duong
(74) *Attorney, Agent, or Firm* — Oliff & Berridge, PLC

(57) ABSTRACT

An air seal device having a housing with a passageway, a core body that is configured to fit tightly within the passageway to restrict air flow through the passageway and to seal the interface between the core body and the housing, and a top ring that locks to the housing and engages and compresses the core body within the housing. The core body has a slit extending vertically therethrough that allows an elongated member or members to pass through the core body while providing an airtight interface between the member or members and the slit of the core body.

20 Claims, 7 Drawing Sheets

AIR SEAL DEVICE

BACKGROUND

1. Field of the Invention

This invention relates to air seal devices, for openings or other passageways in a structural member, that allow the passage of elongated members, such as cables and wires, through the openings or other passageways, while restricting air flow through the openings or other passageways. More particularly, this invention relates to such air seal devices wherein the elongated members pass through the air seal devices.

2. Background of the Invention

There are certain environments in which it is desirable to pass elongated members, such as cables and wires, through an opening or passageway in a structural member, such as a wall, floor or ceiling, while preventing or restricting air flow through the opening or passageway. One such environment is a data center, and the opening or passageway is in an access floor panel, to pass cables, wires, hoses, etc. through the panel.

More specifically, data centers often have a raised floor system, sometimes called an access floor system. An access floor system is usually comprised of a continuous array of floor panels, arranged edge-to-edge, and supported above the sub-floor by support structure. The array of access floor panels usually extends wall-to-wall in the data centers. IT racks, containing and supporting the IT equipment in the data center, are supported by the access floor panels.

A plenum is formed between the sub-floor and the access floor panel array. Cables, wires, hoses, etc. to operate the IT equipment are located in the plenum, and the plenum is also used as a conduit for cooling air. Often, one or more air conditioning units supply air to the plenum, and some of the access floor panels in the access floor panel array have grates. The cooling air passes through the grates into the data center. The grates are usually designed and positioned to direct the cooling air at the IT racks. It is highly desirable that the cooling air pass through the grates for economic and efficient cooling of the IT equipment in the data center.

However, the cables, wires, hoses, etc. need to go from the plenum, through the access floor panels, and into the data center. To do that, those cables, wires, hoses, etc. usually pass through openings or passageways in one or more of the floor panels. Those openings and passageways may reduce the cooling efficiency of the data center because some of the cooling air may pass through those openings and passageways, instead of through the grates as intended and designed. More efficient and economical cooling would be achieved in a data center if a sealing device is provided that restricts air flow through openings and passageways containing cables, wires, hoses, etc.

The most economic and efficient cooling of a data center is desired for at least the following reason. A typical data center includes multiple IT racks. The equipment supported by those racks, and the associated cables and other accessories, generate a relatively high amount of heat. Because of that heat, providing adequate cooling to IT racks in the data center is of paramount importance. Moreover, it is desirable that the IT racks be cooled as efficiently as possible, as the energy costs to cool IT racks may approach a large percentage of the energy costs to operate the data center.

SUMMARY OF THE INVENTION

The air seal device of this invention addresses the need for an air seal device for an opening or passageway in an access floor panel that permits the passage of cables, wires, hoses, etc. therethrough, while restricting air flow through the opening or passageway, as well as the need in other environments for air seal devices that allow the passage of elongated members therethrough, while restricting air flow through the openings or passageways containing the air seal devices.

An air seal device according to one embodiment of this invention includes a housing defining a passageway, a core body that is configured to fit within the housing so as to block air flow through the passageway and seal the interface between the core body and the housing, the core body having a slit therethrough, and a ring that engages the housing and retains and compresses the core body in place within the housing.

In certain embodiments, the core body includes a compressed foam block that is wrapped in a fire retardant/proof covering. The covering may cover the interior or surfaces that define the slit.

In other embodiments, the slit is configured to receive an elongated member through it, the slit deforms to receive the elongated member, and the slit engages the elongated member to restrict airflow through the slit.

DETAILED DESCRIPTION

Figure 1:
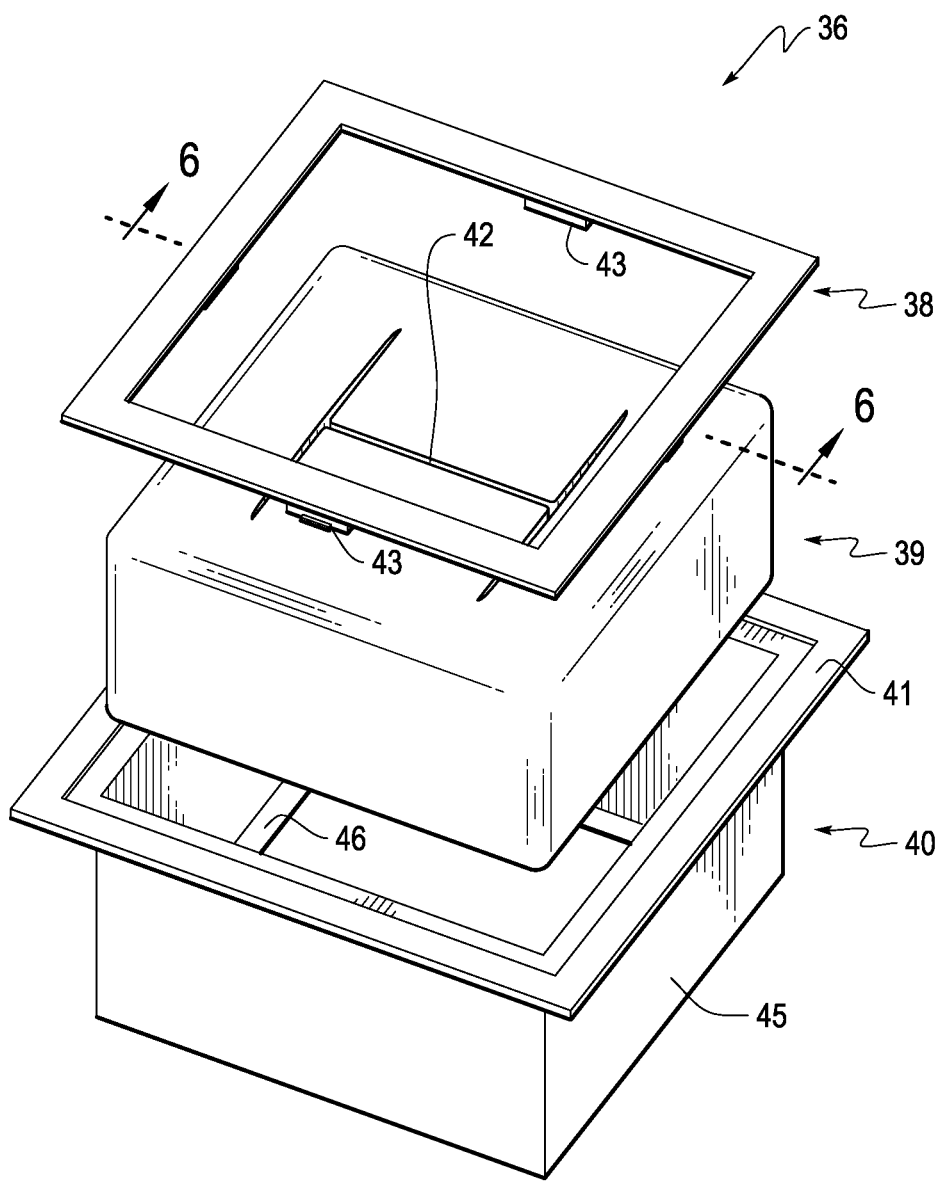
FIG. 1 is an exploded view of one embodiment of this invention.

As stated above, FIG. 1 is an exploded view of one embodiment of the air seal device of this invention, air seal device 36. As shown in FIG. 1, the air seal device 36 comprises three parts, a top ring 38, a core body 39, and a main housing 40.

The main housing 40 houses the core body 39 and has a sidewall 45, a top flange portion 41 and a bottom flange portion 46. See FIGS. 1-4.

In this embodiment, the sidewall 45 is a continuous wall in the shape of an open-ended box. While, in the embodiment illustrated in the figures, the cross-section of the sidewall 45 is a square, i.e., the four sides of the sidewall 45 form a square, the sidewall 45 can have a cross-section of any feasible shape, such as rectangular, parabolic, oval or circular. The sidewall 45 also has spaced recesses 44 in the interior thereof. See FIGS. 3 and 4. The function of the recesses 44 is described below.

Also in this embodiment, the top flange portion 41 extends outwardly from the top rim of the sidewall 45. See FIG. 4. The top flange portion 41 has a recessed portion 50 that receives a portion of the frame portion 48 (discussed below) of the top ring 38. The top flange portion 41 may rest on the structure that defines the opening or passageway in which the air seal device 36 is located.

Conversely in this embodiment, the bottom flange portion 46 extends inwardly from the bottom rim of the sidewall 45. The bottom flange portion 46 has a sufficient width to support the core body 39 when the air seal device 36 is assembled.

Both the top flange portion 41 and the bottom flange portion 46 can be continuous or intermittent flanges.

In this embodiment, the main housing 40 is sized and shaped to fit in an opening in an access floor panel. The top flange portion 41 rests on the surface of the access floor panel that defines and surrounds the opening.

The main housing 40 can be made of any material having sufficient structural rigidity. For example, the main housing 40 may be made of plastic, metal, alloys, wood, etc. Preferably, the main housing 40 is made of metal. The main housing 40 can be provided in various sizes and shapes, depending on the application.

The core body 39 is configured to fit tightly within the main housing 40 to restrict air flow between the core body 39 and the main housing 40. The core body 39 will usually have a size and shape that substantially matches the size and shape of the opening or passageway defined by the sidewall 45 of the main housing 40.

Figure 2:
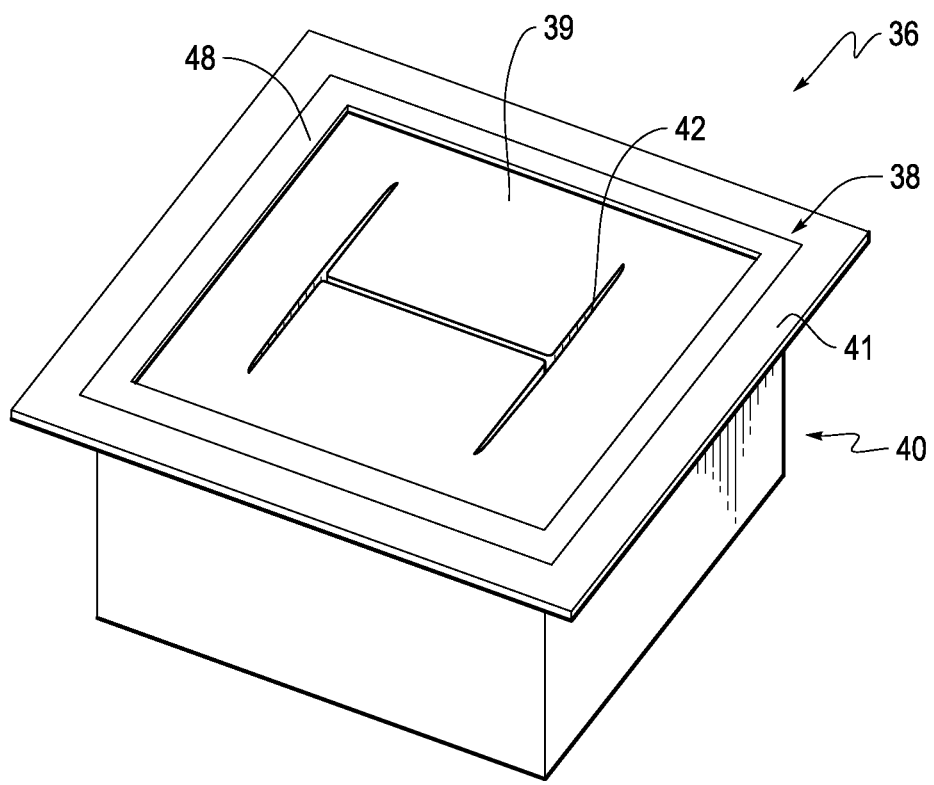
FIG. 2 is a perspective view of the embodiment of this invention illustrated in FIG. 1, fully assembled.
Figure 3:
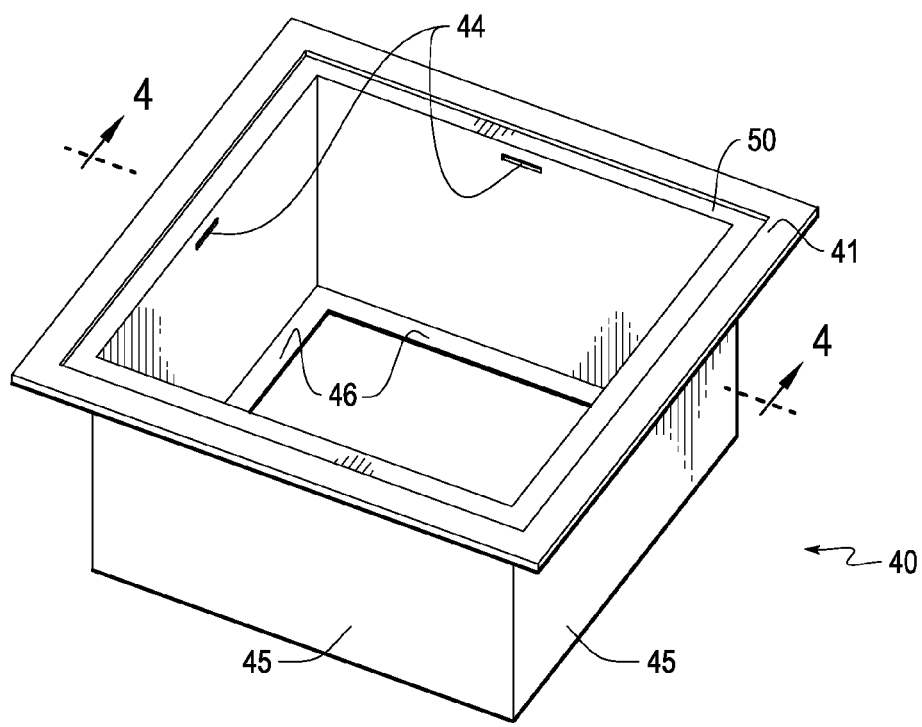
FIG. 3 is a perspective view of the main housing of the embodiment illustrated in FIGS. 1 and 2.
Figure 4:
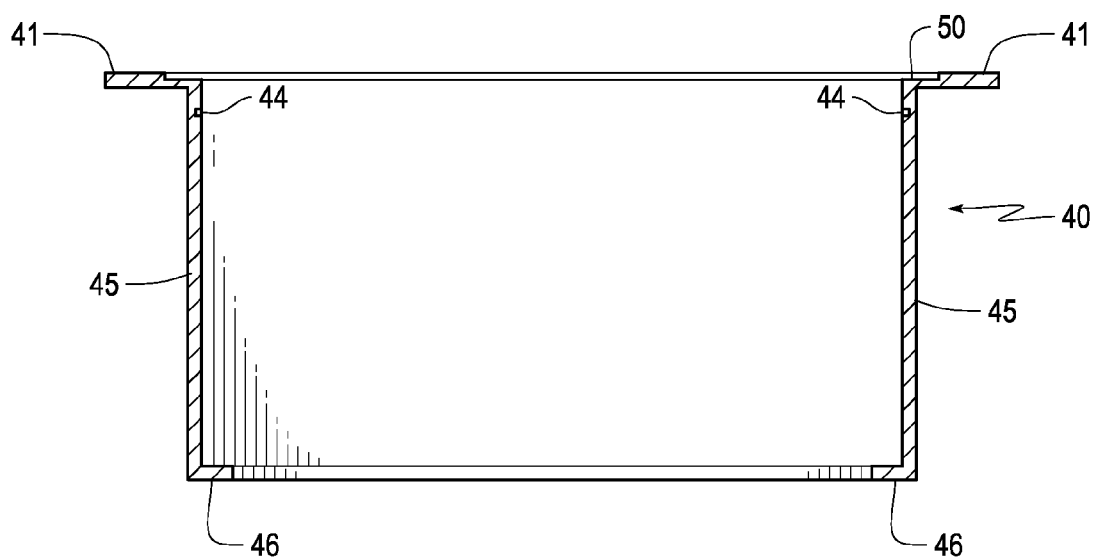
FIG. 4 is a cross sectional view of the main housing illustrated in FIG. 3, along line 4-4 of FIG. 3.
Figure 5:
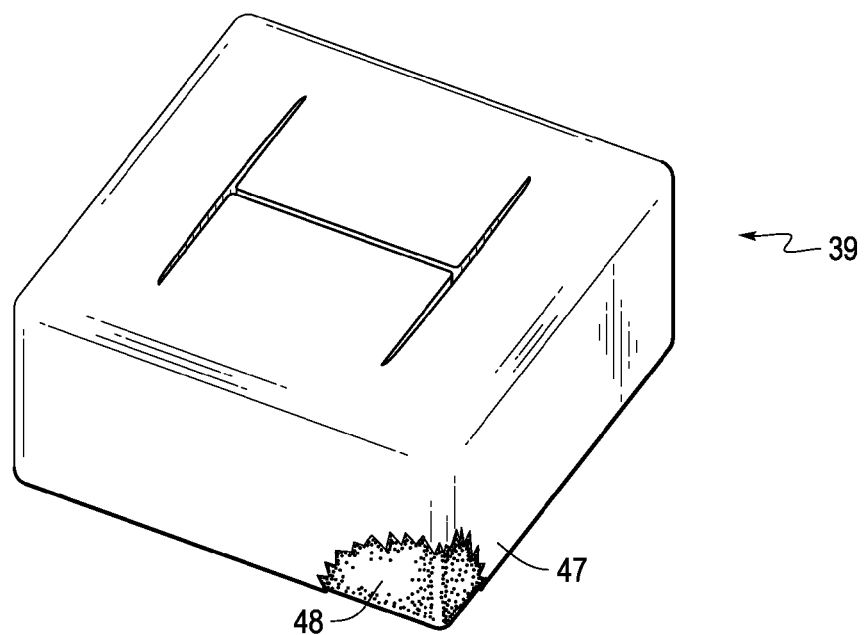
FIG. 5 is a perspective view of the core body of the embodiment of this invention illustrated in FIGS. 1 and 2, with part of the covering removed to reveal the foam block.

The core body 39 has a slit 42 that passes through it. In the embodiment illustrated in the figures, the slit 42 is in the shape of an I beam. That is, as illustrated in FIGS. 1, 2 and 5, the core body 39 has a slit 42 that has a center portion and two perpendicularly extending portions at both ends of the center portion. The shape of the slit 42 is not limited to an I beam, and can be any shape that sufficiently allows the passage of elongated members through it, for example, the bundle of cables and wires 37 (see FIG. 7), while restricting the passage of air. For example, the slit 42 can also be in the shape of an "X".

As illustrated in FIG. 5, the core body 39 is preferably made of a compressed foam block 48 wrapped or encased by a fire resistant or fireproof covering 47. While the block 48 is described herein as being of a compressed foam, the block 48 may be made of any other material that provides the requisite flexibility and air sealing properties. The covering 47 encases or covers all surfaces of the compressed foam block 48, including the interior surfaces formed by the slit 42.

As stated, the core body 39 is designed to be positioned within the opening or passageway defined by the sidewall 45 of the main housing 40 when the air seal device 36 is assembled, with the lower outer perimeter of the core body 39 being supported by the bottom flange portion 46 of the main housing 40.

Figure 6:
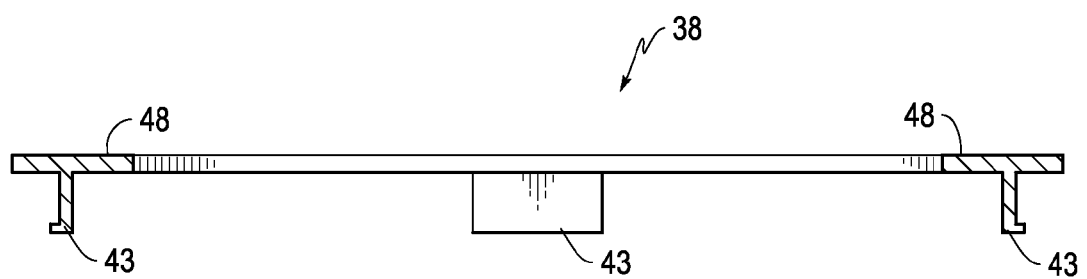
FIG. 6 is a cross sectional view of the top ring of the embodiment illustrated in FIGS. 1 and 2, along line 6-6 of FIG. 1.

The top ring 38 holds the core body 39 in place and presses on the core body 39 by locking onto the main housing 40. In the embodiment illustrated in FIGS. 1 and 6, the top ring 38 has a frame portion 48 and spaced flanges or tongues 43 that extend downwardly from the frame portion 43. When the air seal device 36 is assembled, the outer periphery of the frame portion 48 is received within the recessed portion 50 of the top flange portion 41 of the main housing 40. The spaced flanges or tongues 43 engage with and snap into the corresponding recesses 44 in the sidewall 45. When the main housing 40 is in the shape of a rectangle or square, it is preferable that a recess 44 and a mating flange or tongue 43 be provided on each of the four sides of the main housing 40 and the top ring 38, respectively. The frame portion 43 engages the top peripheral edge of the core body 39 when the air seal device 36 is assembled.

While a tongue and groove connection between the top ring 38 and the main housing 40 is illustrated in the figures, any other connecting or interlocking method or apparatus can be used to connect the top ring 38 and the main housing 40.

FIG. 2 illustrates a completely assembled air seal device 36. The bottom periphery of the core body 39 engages the bottom flange portion 46, the top periphery of the core body 39 engages the top ring 38, and the sidewalls of the core body 39 engage the interior walls of the sidewall 45. The top ring 38 and the main housing 40, including the bottom flange portion 46, compress the core body 39 as desired, depending on the application, so that the core body 39 maximizes its sealing effect. The top surface of the core body 39 is flush with an upper surface of the top flange portion 41 of the main housing 40.

Figure 7:
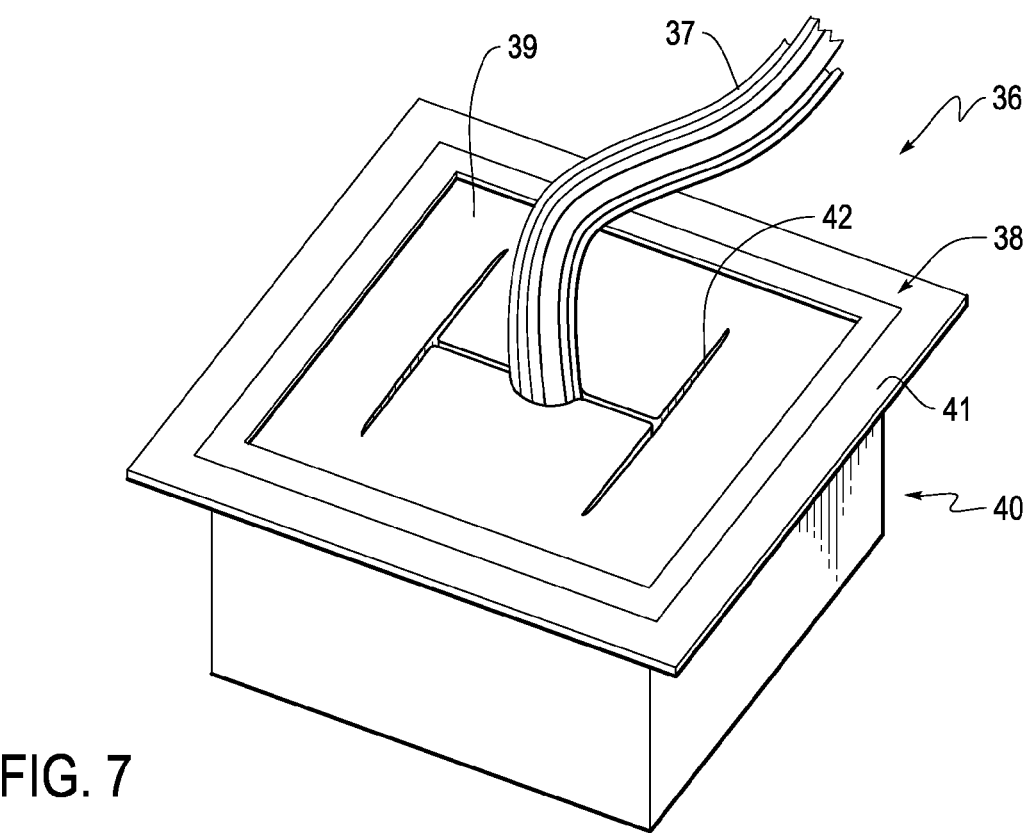
FIG. 7 is a perspective view of the embodiment of this invention illustrated by FIGS. 1-6, illustrating a bundle of cables and wires passing through the core body.

FIG. 7 illustrates the air seal device 36 with a bundle of cables and wires 37 extending through the air seal device 36. The bundle 37 is received in and passes through the slit 42. Because the core body 39 includes block 48 made of compressed foam or other suitable material, the bundle 37 is tightly engaged in the slit 42. That prevents or at least reduces the passage of air through slit 42 around the bundle 37. While FIG. 7 illustrates the bundle of cables and wires 37 passing through the slit 42, any elongated member or members can pass through the slit 42.

Next, one environment in which the air seal device 36 may be utilized is described. That environment is a data center that includes one or more IT racks and an access floor system, as illustrated, in part, in FIG. 8.

Figure 8:
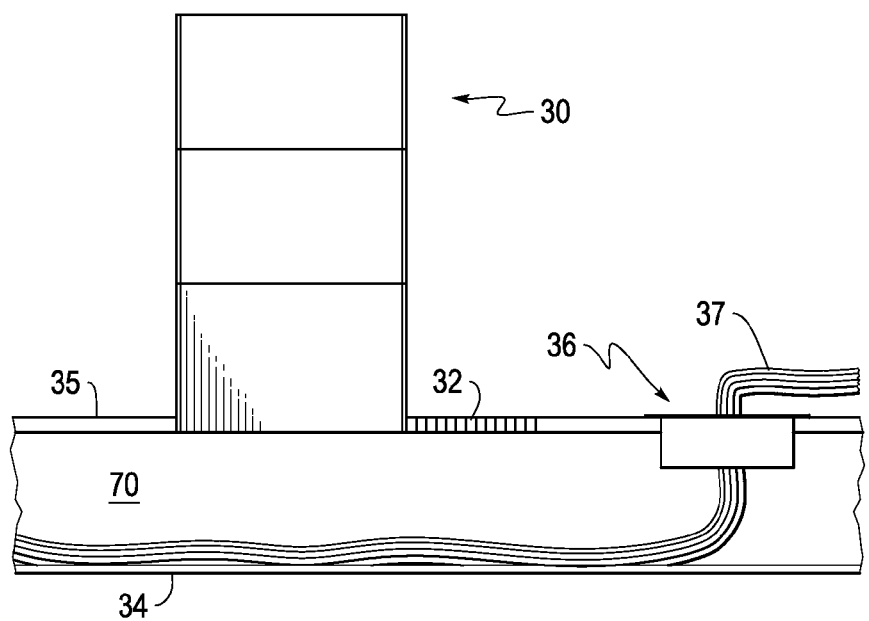
FIG. 8 is a partial view of a data center that includes an air seal device of this invention.

More specifically, in FIG. 8, the IT rack 30 is in a data room and is positioned on and supported by an access floor panel array 35. The access floor panel array 35 is spaced above the subfloor 34. The space or plenum 70 between the access floor panel array 35 and the subfloor 34 contains cables, wires, hoses, bundles of cables and wires, etc., such as bundle of cables and wires 37. That is, the cables, wires, cable and wire bundles, hoses, etc. pass through the space or plenum 70 between a source or outlet and the IT equipment in the data center.

The space or plenum 70 also functions as a conduit for air from an air conditioning unit (not shown). That cooling air is provided to the space above the access floor panel array 35 as follows. An access floor panel array in a data room will usually include multiple grate panels adjacent multiple IT racks. FIG. 8 illustrates one of those grate panels, grate panel 32, positioned immediately adjacent the IT rack 30. Cooling air passes from plenum 70 through the grate panel 32 to cool the IT rack 30. The cooling air is usually directed by the grate panel 32 towards the adjacent IT rack 30.

As illustrated in FIGS. 7 and 8, various cables, wires, cable and wire bundles, hoses, etc., such as bundle of cables and wires 37, must pass through openings or passageways in panels of the access floor panel array 35 for the operation of the equipment in the data center. As discussed above, it is desirable to restrict air flow through those openings or passageways, for economical and efficient cooling of the data center. The air seal device 36 meets that need as it allows passage of, for example, the bundle of cables 37 and wires through the air seal device 36, without allowing cooling air to escape through the area around the bundle 37. Accordingly, when the air seal device 36 is used in an opening in an access floor panel, the passage of air through the opening is minimized, which should result in more efficient cooling of space above the access floor panel array, such as a data center.

FIGS. 9-12 illustrate a second embodiment of this invention, air seal device 36A. One difference between this embodiment and the embodiment of FIGS. 1-6 is that the main housing of this embodiment is comprised of two parts—the upper main housing 60 and the lower main housing 61. Another difference is that the air seal device 36 is square shaped when viewed from the top, while the air seal device 36A is rectangular shaped when viewed from the top. Other differences are discussed below. The parts and elements of the FIGS. 9-12 embodiment that have corresponding parts and elements in the FIGS. 1-6 embodiment have the same number as the corresponding parts and elements in the FIGS. 1-6 embodiment with the added suffix "A."

Figure 9:
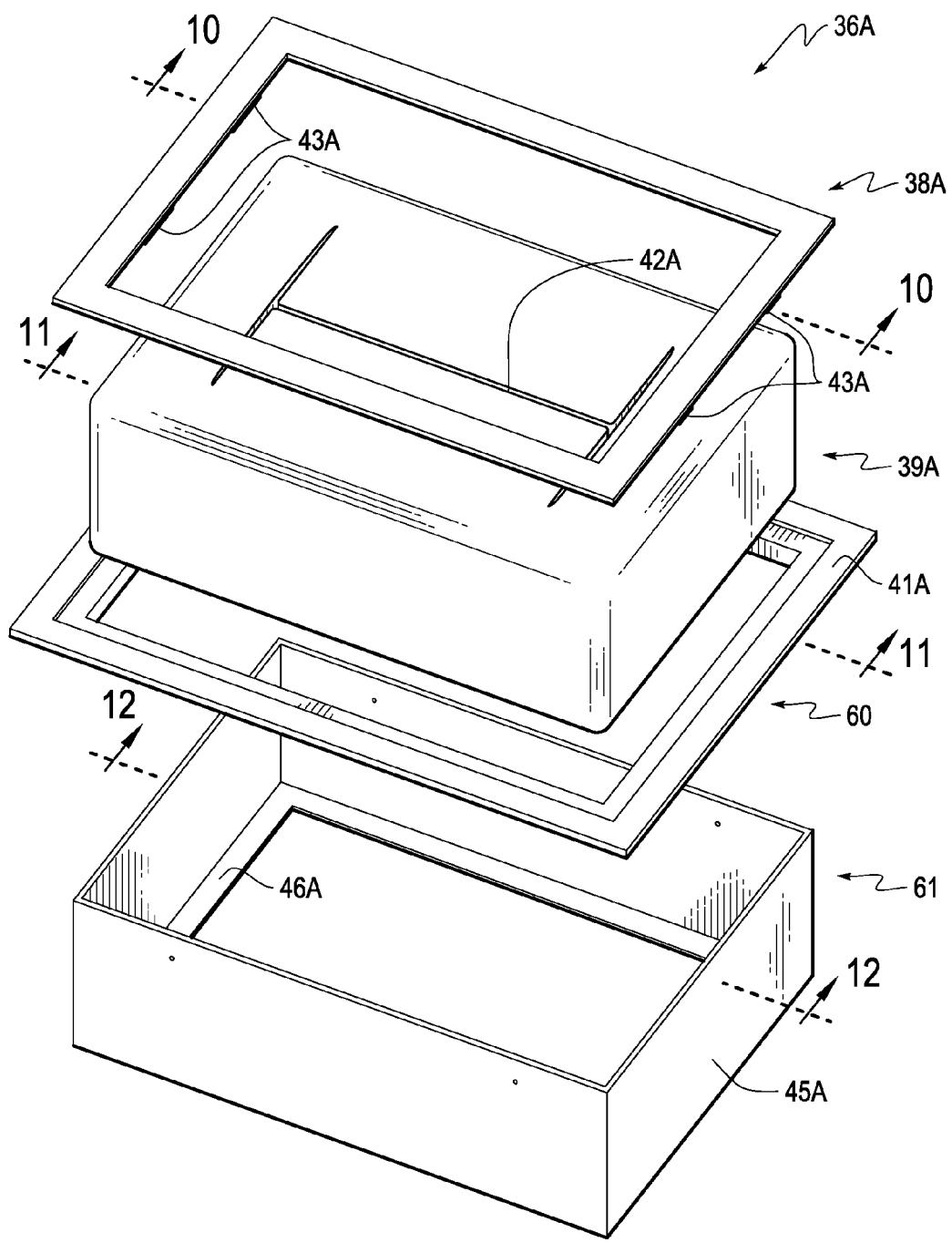
FIG. 9 is an exploded view of another embodiment of this invention.
Figure 10:
FIG. 10 is a cross sectional view of the top ring of the embodiment illustrated in FIG. 9, along line 10-10 of FIG. 9.
Figure 11:
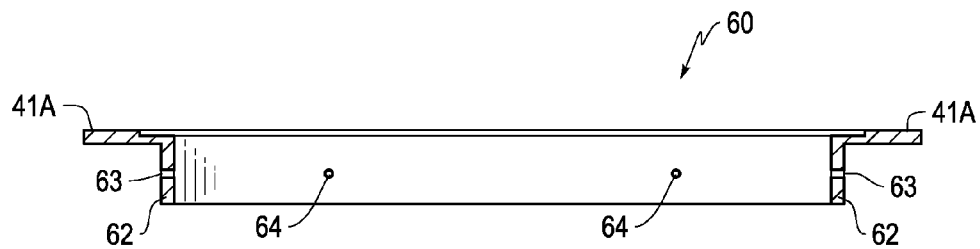
FIG. 11 is a cross sectional view of the top main housing of the embodiment illustrated in FIG. 9, along line 11-11 of FIG. 9.
Figure 12:
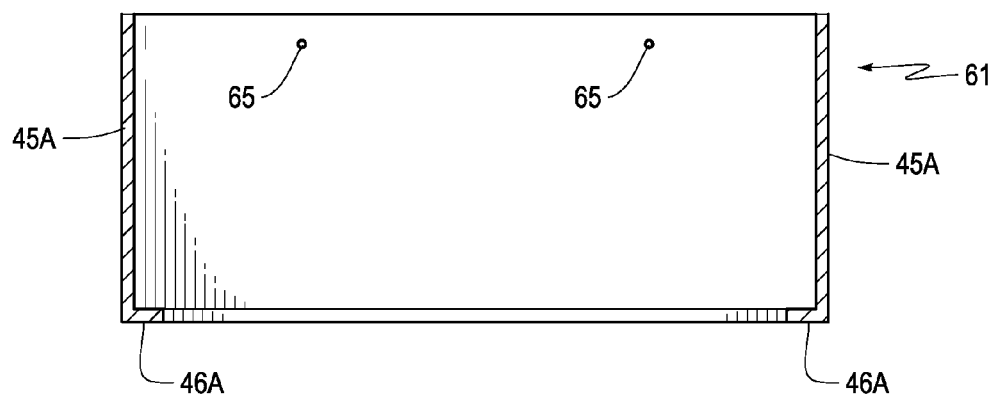
FIG. 12 is a cross sectional view of the bottom main housing of the embodiment illustrated in FIG. 9, along line 12-12 of FIG. 9.

As shown in FIG. 9, the air seal device 36A includes a top ring 38A, a core body 39A, the upper main housing 60 and the lower main housing 61.

The top ring 36A of the air seal device 36A has flanges or tongues 43A that extend downwardly from the frame portion 48A and engage the openings 63 in the upper main housing 60. The flanges or tongues 43A are grouped as pairs on the short sides of the top ring 36A. See FIGS. 9 and 10.

The upper main housing 60 has a top flange portion 41A and a side wall portion 62. The side wall portion 62 extends downward from the top flange portion 41A and is a continuous wall that has openings 63 that receive the flanges or tongues 43A therein when the air seal device 36A is assembled. The side wall portion 62 also has holes 64 that receive screws therethrough, as discussed below. See FIG. 11.

The lower main housing 61 includes the side wall 45A and the bottom flange portion 46A. The lower main housing 61 also includes screw holes 65, which mate with the screw holes 64 in the side wall portion 62 of the upper main housing 60 when the air seal device 36A is assembled.

In this embodiment, the upper main body 60 is made of a plastic material, while the lower main body 61 is made of metal.

When the air seal device 36A is assembled, the screw holes 64 in the side wall portion 62 of the upper main housing 60 are aligned with the screw holes 65 in the lower main housing 61. While screws are described herein as the fastening mechanism, any other suitable fastening mechanism or method can be utilized.

The core body 39A is then placed in the assembled upper main housing 60 and the lower main housing 61, with its lower periphery resting on the bottom flange portion 46A. The top ring 38A is then snapped onto the upper main housing 60, with the flanges or tongues 43A being received in the openings 63 in the upper main housing 60. When assembled in that manner, the frame portion 48A presses and compresses the core body 39A.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. An air seal device comprising:
    a housing defining a passageway;
    a core body that is configured to fit within the housing so as to block air flow through the passageway and seal an interface between the core body and the housing, the core body having a slit extending therethrough; and
    a ring that engages the housing and retains and compresses the core body within the housing.

2. The air seal device according to claim 1, wherein the core body includes a compressed foam block.

3. The air seal device according to claim 2, wherein the core body has at least one of a fire proof and fire retardant outer layer that encompasses the compressed foam block.

4. An air seal device according to claim 3, wherein the fireproof or fire retardant outer layer covers the interior surfaces that define the slit.

5. The air seal device according to claim 1, wherein the slit is in a shape of an I beam.

6. The air seal device according to claim 1, wherein the housing has first and second opposite ends, with the passageway extending between the first and second opposite ends, and wherein the first opposite end has a first flange that extends onto the passageway and engages the core body.

7. The air seal device according to claim 6, wherein the first flange engages a periphery of a first end of the core body.

8. The air seal device according to claim 7, wherein the ring is a top ring and has a frame portion that engages a second end of the core body.

9. The air seal device according to claim 8, wherein the core body is compressed by the top ring and the housing, including the first flange.

10. The air seal device according to claim 9, wherein the ring has extending flange portions that engage the housing.

11. The air seal device according to claim 10, wherein the extending flanges extend substantially perpendicularly from the frame portion.

12. The air seal device according to claim 6, wherein the housing includes a second flange at the second opposite end that extends away from the passageway.

13. The air seal device according to claim 1, wherein the slit is configured to receive an elongated member therethrough.

14. An air seal device for an opening in an access floor panel comprising:
    a housing that fits into the opening and defines a passageway;
    a core body that is configured to fit within the housing so as to block air flow through the passageway and seal an interface between the core body and the housing, the core body having a slit extending therethrough; and
    a top ring that engages the housing and retains and compresses the core body within the housing.

15. The air seal device according to claim 14, wherein the slit is configured to receive elongated members therethrough.

16. The air seal device according to claim 15, wherein the slit deforms to receive the elongated members.

17. The air seal device according to claim 16, wherein the slit engages the elongated members to restrict air flow through the slit.

18. The air seal device according to claim 17, wherein the core body includes a compressed foam block.

19. The air seal device according to claim 18, wherein the core body has at least one of a fire proof and fire retardant outer layer that encompasses the compressed foam block.

20. The air seal device according to claim 19, wherein
    the housing has first and second opposite ends, with the passageway extending between the first and second opposite ends,
    the first opposite end has a first flange that extends into the passageway and engages a first end of the core body, and the top ring has a frame portion that engages a second end of the core body.

* * * * *